United States Patent [19]
Ko

[11] Patent Number: 4,600,034
[45] Date of Patent: Jul. 15, 1986

[54] DEVICE FOR THE PERCEPTION OF GAS FLOW

[75] Inventor: Sung H. Ko, Anyang, Rep. of Korea

[73] Assignee: Il Kwang Co., Ltd., Kwang Ju, Rep. of Korea

[21] Appl. No.: 641,327

[22] Filed: Aug. 16, 1984

[30] Foreign Application Priority Data

Sep. 24, 1983 [KR] Rep. of Korea ..................... 83-4479

[51] Int. Cl.$^4$ ............................................. F16K 37/00
[52] U.S. Cl. ................................... 137/554; 137/557; 251/65; 251/75; 200/81.9 M
[58] Field of Search ....................... 251/58, 61, 65, 75; 137/554, 557; 116/267; 200/81.9 M

[56] References Cited

U.S. PATENT DOCUMENTS

| 1,875,511 | 9/1932 | Shivers | 251/65 |
| 2,353,740 | 7/1944 | Malone | 251/65 |
| 3,121,552 | 2/1964 | Wilson | 251/65 |
| 3,199,524 | 8/1965 | Mitchell | 251/65 |
| 3,522,596 | 8/1970 | Fowler et al. | 137/554 |

FOREIGN PATENT DOCUMENTS

| 23602 | 11/1972 | Japan | 137/554 |
| 81/00209 | 2/1981 | PCT Int'l Appl. | 251/65 |

Primary Examiner—A. Michael Chambers
Attorney, Agent, or Firm—Fleit, Jacobson, Cohn & Price

[57] ABSTRACT

This device is to be installed between the origin of a gas supply and a gas supply pipe on a gas utilizing tool. As a diaphragm moves up, due to the difference in atmospheric pressure inside a chamber of the device, a first magnet positioned on an elastic plate is moved up by the magnetic forces of mutual attraction from second magnets secured to a plate on the diaphragm. The first magnet is subject to moving out of the magnetic attraction force area by the repulsion of the magnets and the force of restitution of the elastic plate. The supply of gas is dependent on the opening of a valve mounted on the elastic plate. As the first magnet moves away from the plate on the diaphragm, the magnetic forces of the first magnet move a lead-switch to the "ON" state to indicate gas is flowing. In case of a large leakage of gas at the gas utilizing tool side of the device, the atmospheric pressure of the upper portion of the chamber is reduced, and the increased atmospheric pressure inside the lower portion of the chamber rapidly forces the diaphragm up and pulls up. A crosspiece of a U frame mounted on the plate on the diaphragm lifts the elastic plate and the valve to cause the shutting "OFF" of the supply of gas.

7 Claims, 7 Drawing Figures

DEVICE FOR THE PERCEPTION OF GAS FLOW

BACKGROUND OF THE INVENTION

The present invention relates to a device for the perception of gas flow. The device is installed in a gas supply line between the point of origin of the gas supply and a gas utilizing tool. The inside of an air-tight chamber is sectioned off into an upper chamber and a lower chamber by a diaphragm. The inlet and outlet for the supply of gas are introduced into the lower chamber. The inlet and outlet each have an airpipe leading to and being in communication with the upper chamber. A valve for opening and shutting of the gas outlet is positioned on the outlet side of the device, in the lower chamber.

SUMMARY OF THE INVENTION

When the atmospheric pressure in the upper chamber changes, the diaphragm is forced up or down and a valve body in the lower chamber opens or shuts the gas outlet. Two permanent magnets are positioned on one side of the diaphragm and are spaced from each other on a plate, the plate being secured to the middle of the diaphragm. The valve body, for the opening and shutting of the gas outlet, is fixed at one end of an elastic plate and, at the other end of the elastic plate, is positioned another permanent magnet. The magnet on the elastic plate moves up and down in the space between the magnets on the diaphragm plate.

Due to the difference in the atmospheric pressure between the upper and lower chambers, separated by the diaphragm, the diaphragm moves up and down. Every move up and down of the diaphragm affects the magnet fixed on the elastic plate. When the diaphragm is at rest due to the normal flow of gas through the chamber, the magnet on the elastic plate is in a state of attraction to the magnets positioned on the plate on the diaphragm and the magnet on the elastic plate moves up at first and is subsequently forced to move downwardly due to the restraining force and the force of restitution of the elastic plate, causing a repetitive upward and downward motion of the magnet on the elastic plate.

The repetitious action of the elastic plate prompts the valve, mounted on the elastic plate, to perform an automatic opening and shutting of the gas outlet. The legs of a frame in the form of a U are mounted on the plate secured to the diaphragm, the crosspiece of the U frame being positioned relative to the space between the magnet and the valve body positioned on the elastic plate.

In case a large quantity of gas escapes, due to the failure of the proper operation of the gas utilizing tool on the outlet side of the device, the sudden change of atmospheric pressure, being decreased in the upper chamber and increased in the lower chamber, forces the diaphragm to move up rapidly and at that moment causes the U frame to lift the elastic plate and break the continued leakage of gas instantly due to the closing of the outlet by the valve body.

The lead-switch, positioned in the housing, separate from the chamber, is positioned below the center of the lower chamber. The lead-switch is set in the "ON" position by the effect of the magnetic forces as the magnet on the elastic plate approaches toward the bottom of the lower chamber. The valve for opening and shutting of the gas outlet is opened and the signal of "ON" is indicated by a light connected to the lead-switch to depict that the gas is flowing.

It is an object of the present invention to confirm that gas is flowing through the gas supply pipe.

It is another object of the present invention to provide an immediate discontinuance of the flow of gas when the gas line is being inspected due to a gas leak and/or the escape of a large quantity of gas, and by doing so, the present invention prevents an explosion or a poisoning accident due to gas leakage.

It is yet another object of the present invention to provide a device for the perception of the flow of gas wherein the flow of gas can be conserved by the rapid opening and closing of a gas flow valve.

BRIEF DESCRIPTION OF THE DRAWINGS

The structure of the device for the perception of gas flow is explained with the aid of the attached Figures.

DETAILED DESCRIPTION OF THE DRAWINGS

Figure 1:
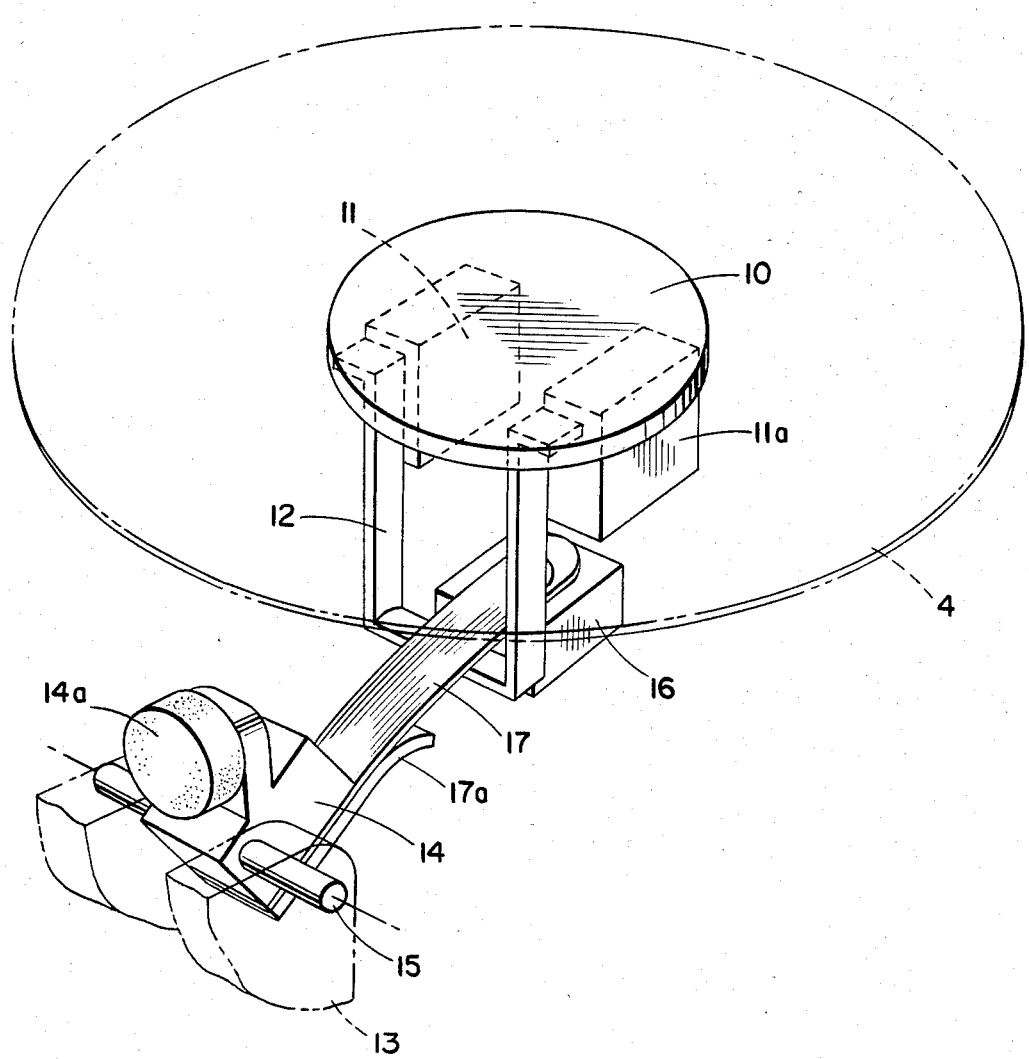
FIG. 1 is an enlarged perspective view of some of the moving parts in FIGS. 2 through 4.

At the sides of chamber (3), are formed a gas inlet (1) on one side, and a gas outlet (2) on the other side. The coil spring (5) pressing down on the center of the diaphragm (4) is covered with cap frame (6). The diaphragm (4) divides chamber (3) into lower chamber (7) and the upper chamber (8). Airpipes (9), (9a) pass to the upper chamber from gas inlet (1) and gas outlet (2), respectively, and one side of the airpipe (9a) is equipped with air valve (V), controlling the passage of air through the airpipe (9a).

As shown in FIG. 1, two permanent magnets (11), (11a) are spaced from each other a distance on the bottom of plate (10). The plate (10) is secured to the center portion of the bottom of the diaphragm (4) and on one side of both magnets (11), (11a) is fastened the leg portions of U frame (12) to the plate (10).

The inside diameter of the admission part (2a) leading to outlet (2) from the lower chamber (7) is less than that of the airpipe (9) linking the upper chamber (8) to the outlet (2). A valve body (14), has an elastic valve (14a). The elastic valve (14a) is adjusted relative to the support (13). The support (13) is positioned below the admission part (2a). The valve (14a) is rotatably mounted on a pin (15). Connected to the valve body (14) is an elastic plate (17) having another permanent magnet (16) riveted to the elastic body at the opposite end from the valve body (14). The plate (17) has a prop (17a). The magnet (16), is fixed on the elastic plate so as to go up and down in the space between the magnets (11), (11a).

A lead-switch (18) is positioned in the housing (7a), below the bottom of the lower chamber (7), and the seat (3a), on which the magnet (16) rests upon. The seat (3a) is positioned on the exterior surface of housing (7a).

Figure 3:
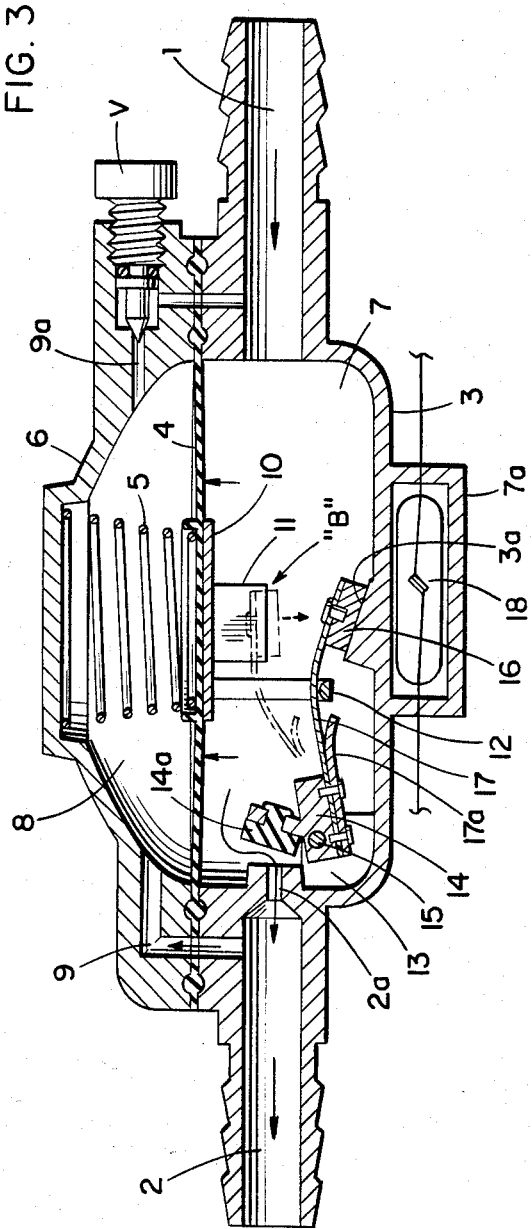
FIG. 3 is a cross-sectional view of the present invention in the position for gas flow.
Figure 5:
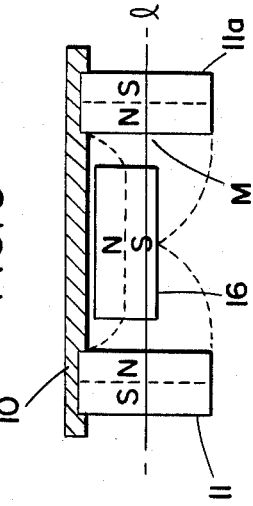
FIG. 5 is a detailed view of the area indicated by "A" in FIG. 2.

As is shown in FIG. 5, the magnets (11), (11a), attached to the bottom of the plate (10), are positioned so that the inside of each magnet are of an N pole. The magnet (16) has an N pole on its top portion and S pole on its bottom portion relative to plate (10). The elastic plate (17) is made of thin flexible material so that its middle portion can be bent upwardly as shown in FIG. 3.

The elastic force of the elastic plate (17) allows for the movement of the plate (17) to a certain degree when the magnet (16) moves in and out of the space above and below the straight line (l) shown in FIGS. 5 and 6. The line (l) is parallel to the plate (10), and is drawn through the center of and between magnets (11), (11a).

In a preferred embodiment of the present invention, the device is installed in a gas supply line, halfway between the origin of the gas supply and the tool utilizing the gas. A signal lamp, capable of being turned "ON" and "OFF" is fitted to the lead-switch (18), to indicate the "ON" or "OFF" position of the lead-switch (18). The present invention may be utilized in connection with a household gas range.

Figure 2:
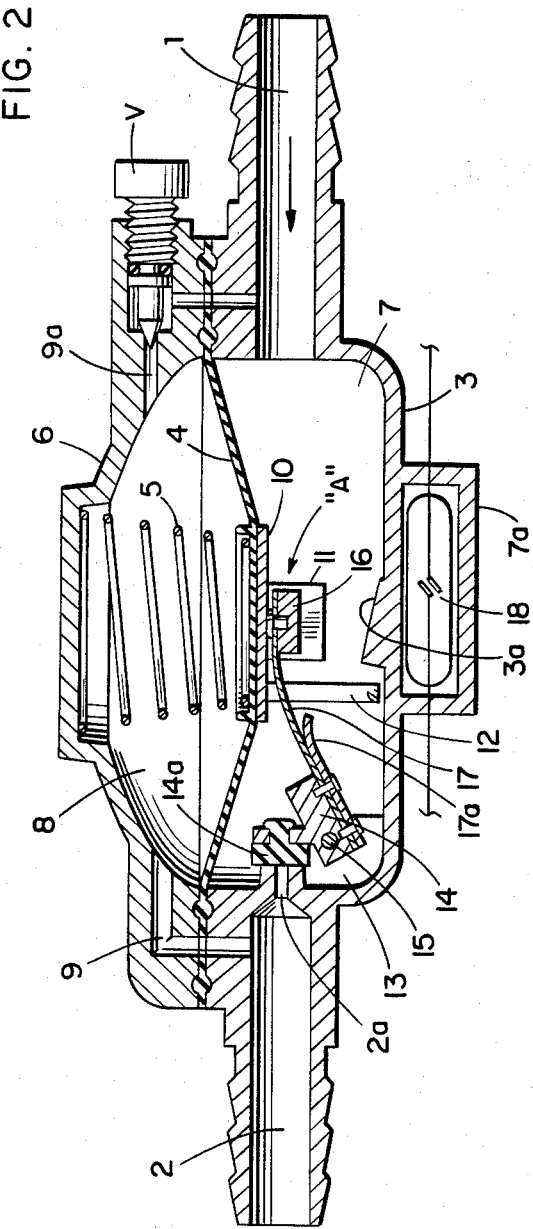
FIG. 2 is a cross-sectional view of the present invention in the position of discontinued gas flow.

FIG. 2 illustrates the position of the device when there is no gas flowing; when the tool utilizing the gas such as a gas range is off. In this case, the diaphragm (4) is pushed downward by the pressure of coil spring (5) set inside the upper chamber (8) and the magnets (11), (11a) positioned under plate (10) attract the magnet (16) seated on the elastic plate (17). At this moment, the magnet (16) moves up into the space between magnets (11), (11a) due to a mutual magnetic absorption force, and sticks in the area between the magnets (11), (11a). As illustrated in FIG. 5, the magnet (16) moves up by the absorption action of mutual magnetic lines of force (M), as the magnets (11), (11a) approach the magnet (16), and force magnet (16) to stick to the bottom plate (10), the magnet (16) extending, in part, beyond parallel line (l).

By such action, the elastic plate (17) serves as an elastic lever, and valve (14a) closes the admission part (2a), as valve body (14) rotates in a counter-clockwise direction, using the pin (15) as a pivot axis even though the gas is pressured by the inlet supply source to continue flowing into the admission part (2a). The lead-switch is set in the "OFF" position when the lead-switch is out of the magnetic force area of the magnet (16) as shown in FIG. 2. When the lead-switch is in the "OFF" position, it is indicative of no gas flow.

If the gas range is to be ignited and a control knob (not shown) of a gas utilizing tool is slowly turned on to initiate the drawing of gas through the chamber (3) from outlet (2), the atmospheric pressure in the upper chamber is drawn toward the outlet (2) through airpipe (9), and the atmospheric pressure in the upper chamber is reduced. The diaphragm (4) is lifted upward due to the the difference in pressure between the atmospheric pressure in the upper chamber (8) and the lower chamber (7). At this time, the coil spring becomes contracted due to the lifting of the diaphragm and the magnet (16) stuck in the space between the magnets (11), (11a), is at first lifted upward with the plate (10), by the absorption force of the magnets (11), (11a), but the magnet (16) is ultimately forced down below the parallel center line (l) by the restraining force caused by the restitution of the elastic plate (17) as shown in FIGS. 3 and 6.

The magnet (16) moves downward from the space between both magnets (11), (11a) by the mutual magnetic repulsive force of the N poles and their magnetic fields. Accordingly, magnet (16) moves down to the seat (3a), and when the valve body on the elastic plate (17) moves clockwise, the admission part (2a), previously closed by the valve (14a) now opens, thereby allowing the flow of gas through admission part (2a) as shown in FIG. 3. When the magnet (16) moves close to the lead-switch (18), the lead-switch is set in the "ON" position by magnetic force, causing the signal lamp to be lighted. The lighting of the signal lamp indicates that gas is flowing.

Some portion of the gas, having advanced through the admission part (2a), reaches upper chamber (8) through airpipe (9), as shown by the arrow in airpipe (9) in FIG. 3. This maintains the atmospheric pressure balance with the lower chamber (7) and, at the same time, maintains the force of repulsion of the coil spring and prevents the coil spring from being contracted and causes the diaphragm (4) to move downward for a moment. In this condition, the magnets (11), (11a) approach toward the magnet (16) positioned on the seat (3a). The magnet (16) moves up again by the action of the mutual magnetic forces between the magnet (16) and magnets (11), (11a) as shown in FIG. 2, thereby setting the lead-switch in the "OFF" position. The valve body (14) turns in a counter-clockwise direction causing the valve (14a) to close the admission part (2a). As the gas continues flowing through inlet (1), the above mentioned opening action repeats. This is due to a buildup of pressure in the lower chamber forcing the diaphragm upwards. As the up and down action of the magnet (16) is incessantly repeated in proportion to the quantity of gas flowing, the lead-switch also continues the action of turning "ON" and "OFF" the light of the signal lamp, the signal lamp indicating that gas is flowing.

If the gas range or gas utilizing tool is turned off when the device is in the momentary position as shown in FIG. 2, the device maintains the position as illustrated in FIG. 2. Namely, the valve (14a) has closed the admission part (2a), magnet (16) is in an elevated state and the lead-switch (18) is in an "OFF" indicating position. This situation represents the suspension of the gas supply.

In case the gas range or tool is turned off while the device is in the momentary state as shown in FIG. 3, lower chamber (7) and upper chamber (8) alter the balance of pressure through airpipe (9) when the valve (14a) is open as described previously, while simultaneously the diaphragm (4) moves downward by the expansion of coil spring (5). At that moment, following the magnet (16) going up and clinging between the magnets (11), (11a), as shown in FIG. 2, valve (14a) closes the admission part (2a), and lead-switch (18) is set in the "OFF" indicating position. This situation indicates the suspension of gas flow.

When the gas supply pipe or gas utility tool is out of order, for example, if there is a large leakage of gas somewhere in a pipe (not shown) connected to inlet (1), the atmospheric pressure is reduced in the lower chamber (7), and as shown in FIG. 2, diaphragm (4) is forced downward by the expansion of coil spring (5) into the lower pressure area of the lower chamber. Consequently, the magnet (16) moves up and sticks between the magnets (11), (11a), and the lead switch (18) is set in the "OFF" position. This situation indicates the suspension of gas supply flow.

Figure 4:
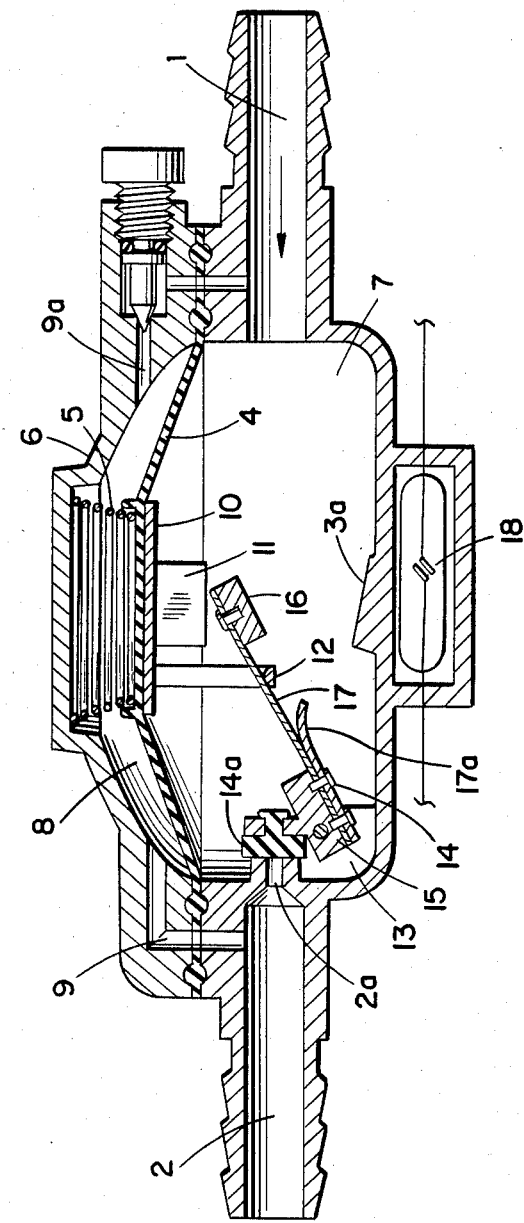
FIG. 4 is a cross-sectional view of the present invention in the position of emergency discontinuance of gas flow.

If a large leakage or escape of gas occurs in the pipe (not shown) on the side of outlet (2), the atmospheric pressure in the upper chamber (8) exhausts quickly through airpipe (9), and the quantity of gas exiting through the admission part (2a), having a small inside diameter, is less than that of the gas being supplied into the lower chamber through the inlet. Therefore, the atmospheric pressure is heightened in lower chamber (7) and, as shown in FIG. 4, diaphragm (4) is pushed upward rapidly, thereby collapsing coil spring (5) and the crosspiece of U frame (12) having legs seated on plate (10), pulls elastic plate (17) upward. At this moment, the valve body (14) moves in the counter-clockwise direction, causing valve (14a) to close the admission part (2a) and instantly break the supply of gas through the outlet (2). The lead-switch (18) is set in the "OFF" position, indicating the suspension of gas supply.

Under this condition, if the gas supply is shut off at the origin of the gas supply and the gas leakage is fixed, and then air valve (V) is opened, the upper chamber (8) and the lower chamber (7) resume maintenance of a balanced atmospheric pressure. This causes the contracted coil spring (5) to become elastic again to move the diaphragm downward, restored to the condition as shown in FIG. 2. Tightening the air valve (V) and closing the airpipe (9a) resumes the proper running of the device.

Figure 7:
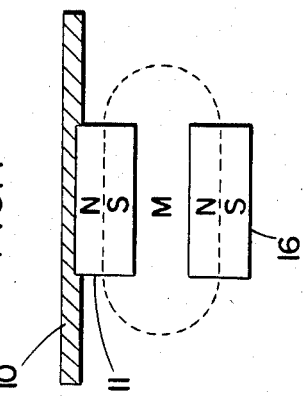
FIG. 7 illustrates an alternate arrangement of the magnets shown in FIGS. 5 and 6.
Figure 6:
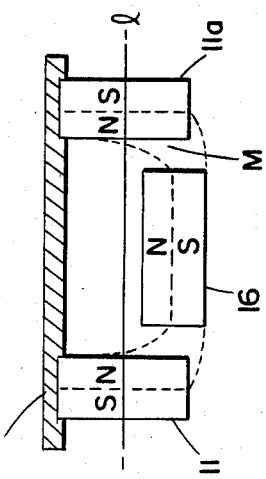
FIG. 6 is a detailed view of the area indicated by "B" in FIG. 3.

FIG. 7 illustrates a different embodiment from those illustrated in FIGS. 5 and 6, showing a permanent magnet (11) positioned on the middle of the plate (10), having poles positioned opposite to the poles of the permanent magnet (16). The embodiment of FIG. 7 operates in the same manner as explained for FIGS. 2 through 6, but in this case, the operation of the device is controlled, dependent on a factor of the magnetic line of force (M) between the magnets (11), (16).

I claim:

1. A device for indicating that gas is flowing through an inlet pipe and an outlet pipe, the flow of gas being indicated by the lighting of an indicator lamp, said device comprising:
    a housing;
    a chamber defined by the housing;
    a diaphragm spanning the chamber;
    a first chamber portion defined on one side of the diaphragm;
    a second chamber portion defined on the other side of the diaphragm, said inlet pipe and said outlet pipe communicating with the second chamber portion;
    a first passage defined by the housing, the first passage communicating at one end with the outlet pipe and at the other end with the first chamber portion;
    a second passage defined by the housing being in communication with the second chamber portion and the outlet pipe, said second passage having a diameter less than the diameter of said outlet pipe and the diameter of said first passage;
    means for opening and closing said second passage, said means for opening and closing having a flexible arm with a first magnet at one end and a valve at the other end, said flexible arm being pivotally mounted in the second chamber portion for moving the valve into engagement with and away from the second passage;
    means for moving the diaphragm in the chamber, said means for moving having a plate secured to the diaphragm, a second magnet and a third magnet mounted on the plate, said second magnet and said third magnet being spaced from one another to allow movement of the first magnet therebetween, and a U frame, said U frame having its legs mounted on the plate and having the flexible arm pass through the space defined by the U frame and the plate for the moving of the flexible arm by the crosspiece of the U frame upon leakage of gas from the outlet pipe; and
    a lead-switch positioned outside of the chamber, the lead-switch being closed by the magnetic force of the first magnet when the first magnet contacts the chamber wall adjacent to the lead-switch thereby lighting the indicator lamp to indicate that the valve has moved away from the second passage to allow gas flow and the lead-switch being opened when the first magnet is drawn from the lead-switch thereby extinguishing the indicator lamp to indicate that the valve has pivoted on the flexible arm to close the second passage to stop gas flow.

2. A device as claimed in claim 1, further comprising a third passage defined by the housing communicating with the inlet pipe and the first chamber portion.

3. A device as claimed in claim 2, further comprising an air valve being positioned in the third passage.

4. A device as claimed in claim 1, wherein said means for moving the diaphragm includes a spring positioned in the first chamber portion being mounted at one end to the diaphragm and at the other end to the wall of the first chamber portion.

5. A device as claimed in claim 1, wherein said second and third magnets are positioned parallel to each other and perpendicular to the plate.

6. A device as claimed in claim 5, wherein the magnetic poles of the second magnet and the third magnet are positioned inwardly towards each other and are of the same magnetism.

7. A device as claimed in claim 6, wherein the magnetic pole of the first magnet closest to the plate is of the same magnetism as the magnetic poles of the second and third magnets positioned inwardly towards each other.

* * * * *